US005798401A

United States Patent [19]

Korenstra et al.

[11] Patent Number: 5,798,401
[45] Date of Patent: Aug. 25, 1998

[54] BITUMINOUS COMPOSITION

[75] Inventors: Jan Korenstra; Willem Cornelis Vonk; Jeroen Van Westrenen, all of Amsterdam, Netherlands

[73] Assignee: Shell Oil Company, Houston, Tex.

[21] Appl. No.: 713,708

[22] Filed: Sep. 13, 1996

[30] Foreign Application Priority Data

Sep. 9, 1995 [EP] European Pat. Off. ............ 95306463

[51] Int. Cl.[6] .................................................. C08L 95/00
[52] U.S. Cl. ............................................................. 524/68
[58] Field of Search ............................................. 524/68

[56] References Cited

U.S. PATENT DOCUMENTS 3,639,521  2/1972  Hsieh ........................................ 525/98
4,129,541  12/1978  Marrs et al. ............................ 524/71
4,412,019  10/1983  Kraus ..................................... 524/68
4,530,652  7/1985  Buck et al. ............................. 524/68

Primary Examiner—Peter A. Szekely
Attorney, Agent, or Firm—Donald F. Haas

[57] ABSTRACT

A bituminous composition comprising a bituminous component and a block copolymer composition which comprises at least one of the group consisting of linear triblock copolymers, multi-armed block copolymers, and diblock copolymers, which block copolymers comprise at least one block of a monovinylaromatic hydrocarbon (A) and at least one block of a conjugated diene (B), wherein the block copolymer composition which is present in an amount in the range of from 1 to 10% wt. based on total bituminous composition has a vinyl content of at least 25% by weight, based on the total diene content, and any diblock copolymer (AB) present has an apparent molecular weight in the range of from 60,000 to 100,000.

5 Claims, No Drawings

BITUMINOUS COMPOSITION

FIELD OF THE INVENTION

The present invention concerns bituminous compositions which can easily be processed and which have advantageous high and low temperature properties which are maintained over time during storage at elevated temperature, giving an improved estimated service life when used in road applications.

BACKGROUND OF THE INVENTION

Butadiene homopolymers with a high vinyl content (determined by infrared examination essentially the same as that set forth in "The Analysis of Natural and Synthetic Rubbers by Infrared Spectroscopy" H. L. Dinsmore and D. C. Smith in Naval Research Laboratory Report No. P-2861, Aug. 20, 1964) are known from U.S. Pat. No. 3,301,840 and are preparable by utilizing a hydrocarbon solvent such as tetrahydrofuran during polymerisation.

U.S. Pat. No. 4,129,541 describes, as a comparison polymer, a block co-polymer which has a vinyl content of 47% by weight (also determined by infrared (IR) techniques) which can be prepared utilising tetrahydrofuran by a process described in U.S. Pat. No. 3,639,521. The authors of U.S. Pat. No. 4,129,541 are seeking an asphalt (also known as bitumen) containing composition which in use as a pipeline coating in the low temperature environment of off-shore pipeline installations would provide for a longer service life by improving resistance to cracking. Their findings show that at temperatures of 0° C. there is generally a gradual decrease in crack time improvement as the conjugated diene level is increased, regardless of the method of polymer preparation, but that for polymers such as the high vinyl polymer A the crack time is actually decreased (i.e. worse) from that of compositions which contain no polymer at all.

The use of high vinyl conjugated diene/monovinyl aromatic block copolymers as modifiers for rubber-modified-asphalt roofing or waterproofing materials is described in U.S. Pat. No. 4,530,652. Such block copolymers have a vinyl content of at least 25%, exemplified as 33, 40 and 45%, based on total diene content, and were found to improve at least one of dispersability in asphalt, viscosity (measured at 177° C.), high temperature flow resistance and low temperature break resistance.

It has now surprisingly been found that attractive low and high temperature properties can be achieved in a high vinyl content block copolymer modified bitumen for road applications and furthermore that such properties can be more attractively retained over time when compared with conventional bitumen blends.

SUMMARY OF THE INVENTION

Accordingly, the present invention provides a bituminous composition which comprises a bituminous component and a block copolymer composition comprising at least one of the group consisting of linear triblock copolymers, multi-armed block copolymers, and diblock copolymers, which block copolymers comprise at least one block of a conjugated diene and at least one block of a monovinylaromatic hydrocarbon, wherein the block copolymer composition (which is present in an amount in the range of from 1 to 10% wt, based on the total bituminous composition) has a vinyl content of at least 25% by weight, based on the total diene content, and any diblock copolymer present has an apparent molecular weight in the range of from 60,000 to 100,000.

With the term "apparent molecular weight" as used throughout the specification is meant the molecular weight of a polymer except polystyrene itself, as measured with gel chromatography (GPC) using poly(styrene) calibration standards (according to ASTM 3536). As discussed below, these polymers have a polydispersity very close to one so this molecular weight is very close to the weight and number average molecular weights.

DETAILED DESCRIPTION OF THE INVENTION

When a coupling agent is used the diblock content is suitably less than 25% wt, preferably less than 15% wt, and more preferably less than 10% wt. By "diblock content", we refer to the amount of unreacted diblock copolymer that is finally present in the prepared block copolymer composition. When the block copolymer composition is prepared via the full sequential preparation method, essentially only triblock copolymers are formed (diblock content is zero) which have an apparent molecular weight in the range of from 120,000 to 200,000.

The block copolymer constituents include linear triblock copolymers (ABA), multi-armed block copolymers ((AB)$_n$X) and diblock copolymers (AB), with A representing a monovinyl aromatic hydrocarbon polymer block, B representing a conjugated diene polymer block, n being an integer of 2 or higher, preferably between 2 and 6 and X representing the residue of a coupling agent. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane and diglycidylether of bisphenol A (Epon® 825 resin).

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627, which are herein incorporated by reference, and EP 0413294 A2, 0387671 B1, 0636654 A1, WO 04/22931.

The block copolymer may therefore, for example, be prepared by coupling at least two diblock copolymer molecules AB together. Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxy-propane, 1-ethoxy-2,2-tert-butoxyethane, of which 1,2-diethoxypropane is most preferred.

The apparent molecular weight of the diblock copolymer (AB) is in the range of from 60,000 to 100,000. Suitably, said diblock copolymer molecular weight is in the range of from 65,000 to 95,000, preferably from 70,000 to 90,000, more preferably from 75,000 to 85,000.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y. 1979.
2. *Light Scattering from Polymer Solution*, M. B. Huglin, ed., Academic Press, New York, N.Y. 1972.
3. W. Kaye and A. J. Havlik, *Applied Optics*, 12, 541 (1973).
4. M. L. McConnell, *American Laboratory*, 63, May, 1978.

The content of monovinyl aromatic hydrocarbon of the final block copolymer is suitably in the range of from 10 to 55% by weight, preferably in the range of from 20 to 45, and more preferably 25 to 40, % by weight based on the total block copolymer.

Suitable monovinyl aromatic hydrocarbons include styrene, o-methylstyrene, p-methylstyrene, p-tert-butylstyrene, 2,4-dimethylstyrene, -methylstyrene, vinylnaphthalene, vinyltoluene and vinylxylene, or mixtures thereof of which styrene being the most preferred.

The total vinyl content of the block copolymer is at least 25% by weight. Preferably the vinyl content is in the range of from 30 to 80, preferably from 35 to 65%, and more preferably 45 to 55% by weight.

Suitable conjugated dienes include those having from 4 to 8 carbon atoms, for example 1,3-butadiene, 2-methyl-1,3-butadiene (isoprene), 2,3-dimethyl-1,3-butadiene, 1,3-pentadiene and 1,3-hexadiene. Mixture of such dienes may also be used. Preferred conjugated dienes are 1,3-butadiene and isoprene, with 1,3-butadiene being the most preferred.

It will be appreciated that with the term "vinyl content" actually is meant that a conjugated diene is polymerised via 1,2-addition. Although a pure "vinyl" group is formed only in the case of 1,2 addition polymerisation of 1,3 butadiene, the effects of 1,2 addition polymerisation of other conjugated dienes on the final properties of the block copolymer and the blends of it with bitumen will be the same.

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphalte", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C. Preferably, bitumens having a penetration in the range of from 60 to 170 dmm are used. Both compatible as well as incompatible bitumens may be used.

The polymer modifier is present in the bituminous composition in an amount in the range of from 1 to 10% by weight, more preferably of from 2 to 8% by weight, based on total bituminous composition.

The bituminous composition may also, optionally, contain other ingredients such as may be required for the end-use envisaged. Of course, if advantageous, other polymer modifiers may also be included in the bituminous composition of the invention.

The improved properties of the polymer-bitumen blends of the present invention, in terms of a low high-temperature viscosity and improved properties retention upon prolonged storage at elevated temperature, enables such blends to be of significant benefit in road application use. Thus, the present invention further relates to the use of the present bituminous composition in an asphalt mixture for road applications. The low high-temperature viscosity means that asphalt mixtures can be produced, applied and compacted at lower temperatures than with conventional binders based on bitumens and block copolymers falling outside the scope of the present invention.

The following Examples illustrate the present invention.

EXAMPLE 1

A first block copolymer of the invention (polymer 1) was prepared by the following full sequential polymerisation process:

90 g styrene was added to 6 litres of cyclohexane at 50° C., after which 5.65 mmol of sec-butyl lithium was added. The reaction was completed after 40 minutes. Hereafter, 1.46 mL diethoxypropane was added, followed by the addition of 400 g of butadiene in 10 minutes. The temperature of the reaction mixture rose to 60° C. The polymerisation was allowed to proceed at this temperature for 85 minutes. Thereafter, the second portion of 90 g styrene is added in 1 minute. The polymerisation is allowed to proceed at 60° C. for 15 minutes before 0.5 mL of ethanol is added to terminate the polymerisation. After cooling down the reaction mixture, 0.6% ionol by weight on polymer was added for stabilisation. The product was isolated by steam stripping to give white crumbs.

Details of the polymer are given in Table 1.

EXAMPLE 2

A second block copolymer of the invention (polymer 2) was prepared by the following process:

180 g styrene was added to 6 litres of cyclohexane at 50° C., after which 11.25 mmol of sec-butyl lithium was added. The reaction was completed after 40 minutes. Hereafter, 1.46 mL diethoxypropane was added, followed by the addition of 400 g of butadiene in 10 minutes. The temperature of the reaction mixture rose to 60° C. The polymerisation was allowed to proceed at this temperature for 85 minutes. At this point in the polymerisation a sample is taken from the reaction and analysed by GPC ASTM D3536. Then the coupling agent (gamma-glycidoxy-propyltrimethoxy silane) was added. The molar amount of coupling agent added, is 0.25 times that of the mmols of sec-butyl lithium for polymer.

The reaction mixture was allowed to stand for 30 minutes at 60° C. After cooling down the reaction mixture, 0.6% by weight of IONOL on polymer was added for stabilisation. The product was isolated by steam stripping to give white crumbs. Details of the polymer are given in Table 1, together with those of the commercially available polymer KRATON® D1101CS (polymer 3) which have been included for reasons of comparison.

EXAMPLE 3

A blend of 7% by weight of polymer in bitumen was prepared for each of polymers 1 to 3 by the following procedure in which a Silverson LR2 high shear mixer was used:

The bitumen was heated to 160° C. and subsequently the polymer was added. During polymer addition the temperature increased to 180° C., which is caused by the energy input of the mixer. At 180° C. the temperature was kept constant by on/off switching of the high shear mixer. Blending was continued until a homogeneous blend was obtained which was monitored by fluorescence microscopy. Generally the blending time was around 60 minutes.

The bitumen grade used for this example is a compatible bitumen, designated PX-100 and having a penetration of 100.

The polymer-bitumen blends were then tested for suitability for road applications. The evaluations for both cold temperature and high temperature performance initially and after 6, 24, 48 and 72 hours ageing time for the polymer blends are given in Table 1 to 3 respectively. The test methods used were:

Viscosity: evaluated at 120° C., 150° C. and 180° C. using a Haake rotoviscometer.
Softening point (Ring and Ball) according to ASTM D36.
Penetrating according to ASTM D5.
Elastic recovery as described in the German TLmOB (1992).
Fraass test according to IP 80.

From Tables 2 to 4 it can clearly be seen that for bitumen blends in accordance with the present invention (Tables 2 and 3), the softening point and elastic recoveries are better retained than for a bitumen blend containing a polymer (Table 4) falling outside the scope of the present invention. This indicates a better polymer stability. The initial viscosities of the blends according to the present invention are lower, whilst the softening points are higher than with the bitumen containing the conventional polymer.

TABLE 1

| Polymer of Ex. No. | Polystyrene (%)[1] | Vinyl (%)[2] | Diblock (Mw) kg/mol[3] | Final (MW) kg/mol[3] | Coupling Efficiency (%)[4] |
|---|---|---|---|---|---|
| 1 | 32.6 | 48.4 | — | 172.8 | full seq |
| 2 | 31.0 | 52.7 | 85.3 | 305.6 | 86 |
| D 1101[5] | 31 | 8 | 87.5 | 171 | 80 |

Ref 1. ASTM D3314
Ref 2. As determined by infrared spectroscopy, generally described in ASTM D 3677
Ref 3. ASTM D3536 as detected by UV absorption
Ref 4. The weight ratio of amount of material formed by coupling to the total amount of 'living' diblock present before coupling.
Ref 5. Product available under tradename KRATON D 1101CS: a linearly coupled triblock copolymer with the MW parameters listed in Table 1.

TABLE 2

Polymer Example 1

|  | 0 hours | 6 hours | 24 hours | 48 hours | 72 hours |
|---|---|---|---|---|---|
| Penetration at 25° C., dmm | 60 | 59 | 60 | 58 | 51 |
| Softening point R & B, °C. | 103 | 99 | 94 | 93 | 95 |
| Dynamic viscosity |  |  |  |  |  |
| at 120° C., mPas | 4530 |  | 6270 | 6280 | 12980 |
| at 150° C., mPas | 980 | 972 | 1097 | 1157 | 1910 |
| at 180° C., mPas | 325 | 331 | 368 | 385 | 597 |
| Ductility recovery at 13° C. 20 cm elong, % | 99.8 | 99.2 | 98.6 | 98.5 | 92.0 |
| Fraass Breakpoint, °C. | −25 | −27 | −24 | −20 | −17 |

TABLE 3

Polymer Example 2

|  | 0 hours | 6 hours | 24 hours | 48 hours | 72 hours |
|---|---|---|---|---|---|
| Penetration at 25° C., dmm | 64 | 62 | 62 | 51 | 47 |
| Softening point R & B, °C. | 103.5 | 101.5 | 97.5 | 93.5 | 94.5 |
| Dynamic viscosity |  |  |  |  |  |
| at 120° C., mPas | 5080 | 5235 | 5956 | 8807 | 14200 |
| at 150° C., mPas | 970 | 1048 | 1205 | 1570 | 2497 |
| at 180° C., mPas | 345 | 346 | 397 | 501 | 701 |
| Ductility recovery at 13° C. 20 cm elong, % | 99.0 | 97.5 | 94.0 | 92.0 | 93.0 |
| Fraass Breakpoint, °C. | −30 | −36 | −22 | −21 | −21 |

TABLE 4

D1101

|  | 0 hours | 6 hours | 24 hours | 48 hours | 72 hours |
|---|---|---|---|---|---|
| Penetration at 25° C., dmm | 62 | 65 | 67 | 62 | 64 |
| Softening point R & B, °C. | 98.5 | 97.5 | 94.5 | 87 | 77 |

TABLE 4-continued

| | D1101 | | | | |
|---|---|---|---|---|---|
| | 0 hours | 6 hours | 24 hours | 48 hours | 72 hours |
| Dynamic viscosity | | | | | |
| at 120° C., mPas | 5174 | 4675 | 4578 | 3940 | 4521 |
| at 150° C., mPas | 1120 | 1003 | 986 | 773 | 875 |
| at 180° C., mPas | 387 | 357 | 347 | 249 | 300 |
| Ductility recovery at 13° C. 20 cm elong, % | 98.5 | 97.5 | 95.5 | 90 | 88 |
| Fraass Breakpoint, °C. | −27 | −24 | −22 | −28 | −26 |

We claim:

1. A bituminous composition comprising (a) a bituminous component and (b) a block copolymer composition which comprises at least one selected from the group consisting of linear triblock copolymers, multi-armed block copolymers, and diblock copolymers, which block copolymers comprise at least one block of a monovinylaromatic hydrocarbon (A) and at least one block of a conjugated diene (B), wherein the block copolymer composition which is present in an amount in the range of from 2 to 8% by weight, based on the total bituminous composition, has a vinyl content of from 35 to 65% by weight, based on the total diene content, and any diblock copolymer (AB) present has an apparent molecular weight in the range of from 60.000 to 100.000 and any triblock copolymer prepared via the full sequential preparation method has an apparent molecular weight in the range of from 120.000 to 200.000.

2. The bituminous composition as claimed in claim 1 wherein the block copolymer has a vinyl content in the range of from 45 to 55% by weight.

3. The bituminous composition as claimed in claim 1 wherein the diblock copolymer has an apparent molecular weight in the range of from 65,000 to 95,000.

4. The bituminous composition as claimed in claim 3 wherein the diblock copolymer has an apparent molecular weight in the range of from 70,000 to 90,000.

5. The bituminous composition as claimed in claim 1 having a diblock content of 25 wt % or less.

* * * * *